Figure 1:
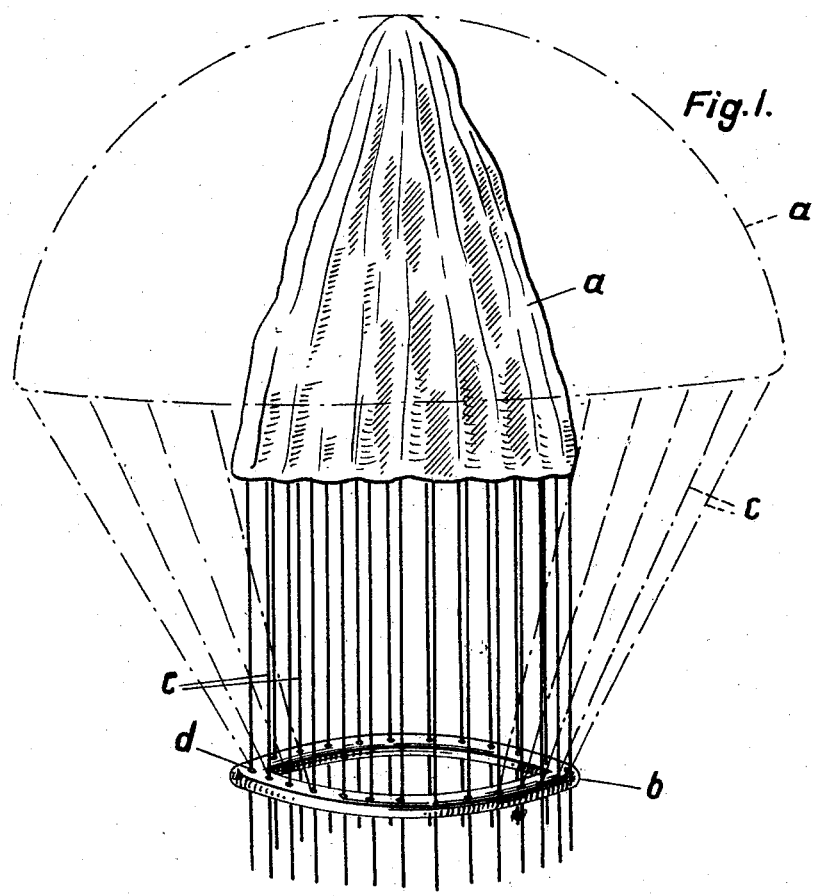

July 22, 1930.  K. T. LENDNER  1,771,261

ROPE GUIDE FOR INSURING THE UNFOLDING OF PARACHUTES

Filed Oct. 27, 1928

Inventor:
Karl Theodor
Lendner

Patented July 22, 1930

1,771,261

UNITED STATES PATENT OFFICE

KARL THEODOR LENDNER, OF HAMBURG, GERMANY

ROPE GUIDE FOR INSURING THE UNFOLDING OF PARACHUTES

Application filed October 27, 1928, Serial No. 315,543, and in Germany November 3, 1927.

Proposals have already been made to prevent the supporting ropes of parachutes from entangling or twisting when the parachute is being collapsed in order to be packed up by passing the lower ends of the ropes through a ring of either rigid or non-rigid material. The object of said ring is to keep the individual ropes separate or remote from one another according to the distance of the holes in it from one another, the ropes being, thus, spread and prevented thereby from entangling and the like.

Another proposal is this, to substitute for the said ring a circular board and, furthermore, to provide knots in the ropes above and below said board in order to prevent this latter from sliding along the ropes.

I have by experience become convinced of the fact that devices or arrangements of the above-mentioned kind are by no means suited for the purpose in view; they fulfil their purpose either insufficiently or not at all. Attention must be paid to the decisive point that the entanglements or twistings take place not only near the lower ends of the cords, or, in the whole, at a definite place, but they continue along the ropes, either along the whole length of them or at least over a comparatively long piece, especially when the parachute is being collapsed or packed up.

Now, when the parachute must be made use of, it is, for the time being, collapsed or packed up and must get transformed from this state into the unfolded state. The ring or disk mentioned is, however, able to do away only with the entangled or twisted rope portions located close to the ring or disk, but is unable to do the same also as regards the more remote entangled portions which is evidently a dangerous circumstance.

The present invention is based on the discovery, also on the practical experiences thereafter made, that for the unquestionably reliable unfolding of the parachute a device is requisite which prevents the arising of twistings and entanglements of the ropes on a comparatively long upper portion of the same. Now, the present invention presents a solution of the problem, and this solution consists in making the rope spreading rings shiftable along the ropes. The same is true if disks instead of rings are employed. The shifting of the rings or disks along the ropes takes place perfectly automatically. If, for instance, the ring pertaining to the ropes of a parachute is located, in the collapsed parachute, near the parachute proper, the air caught up below the parachute proper when the pilot is jumping down is sufficient to cause the parachute to unfold, and the tension thereby exerted upon the ropes is sufficient to cause the ring or disk to move downwardly along the ropes. While the ring or disk is travelling downwardly it removes all twistings or entanglements that may exist in the ropes, and this takes place perfectly automatically until the ring or disk has arrived in its lowermost position in which it is stopped by any suitable abutment.

Figure 2:
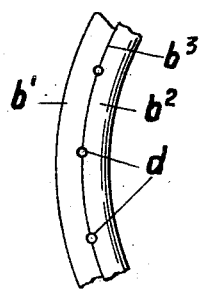
Figure 3:
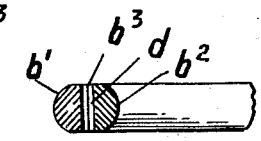

The invention is illustrated diagrammatically and by way of example on the accompanying drawing on which Figure 1 is a perspective representation of a parachute provided with a rope guide designed according to this invention, the parachute being drawn in full lines in collapsed state and in dotted lines in expanded state. Figure 2 is a plan of a piece of a modified rope guide, drawn to a larger scale relatively to Fig. 1, and Figure 3 is a transverse section through this modified guide. On the drawing $a$ denotes the parachute proper; $c$ are the ropes hanging down from it; and $b$ is the shiftable ring which is provided with bores $d$ through which the ropes loosely pass. The ring $b$ is located upon the ropes about on the first third of their length, reckoned from the parachute proper $a$, and the free sectional area just below the parachute is large enough to cause complete unfolding of the same instantly after the pilot has jumped down. The angle which the ropes or shrouds make with the ring $d$ (see the dotted lines in the figure) causes the ring to move downwardly, and it proceeds in this movement until it has arrived at the predetermined end of its path where there are suitable abutment members (not shown). While the ring (or the disk, if such a one has been provided instead of a ring) is travelling downwards with greater or lesser speed, according to the number and kind of the twistings or entanglements in the ropes or cords, these twistings or entanglements are removed by the ring which takes place in a perfectly automatic manner, the ropes or cords being retransformed into their proper shape in which they look, in their entirety, like a hopper.

While the constructional form shown in the drawing (Fig. 1) is intended for new parachutes, in the manufacture of which the ropes or cords can be passed through the bores of the ring (or disk) $b$, I have shown in Figs. 2 and 3 another constructional form intended for existing parachutes. In this modification the ring is bipartite and consists of two concentric rings $b^1$ and $b^2$, of which $b^2$ fits accurately into $b^1$. $b^3$ denotes the joint between them. The bores $d$ are located just as in the non-divided ring of Fig. 1. It is obvious that these rings can be applied to the ropes or cords of existing parachutes, the ring $b^1$ being located outside the ropes or cords and the ring $b^2$ being located inside of the same. After having been brought in place, the ring parts are connected with one another by a few screws.

I claim:

1. In combination with a parachute and its cords: a ring having bores through which said cords pass and which is loosely shiftable upon the cords, said ring being arranged upon the cords remote from the parachute on about the first third of the length of the cords reckoned from the parachute, substantially and for the purpose set forth.

2. In combination with a parachute and its cords: a bipartite ring comprising an inner member and an outer member accurately fitting onto the inner one, the complete ring having a circle of bores located at the joint between said two members, substantially and for the purpose set forth.

3. In combination with a parachute and its cords: a ring having bores through which said cords pass and which is loosely shiftable upon the cords, said ring being arranged upon the cords remote from the parachute on about the first third of the length of the cords reckoned from the parachute, and the diameter of the said ring being such that the free sectional area of the collapsed parachute at the lower end thereof is large enough to cause complete unfolding of the same when the aviator is jumping down.

In testimony whereof I affix my signature.

KARL THEODOR LENDNER.